US006657772B2

(12) United States Patent
Loxley

(10) Patent No.: US 6,657,772 B2
(45) Date of Patent: Dec. 2, 2003

(54) ELECTRO-OPTIC DISPLAY AND ADHESIVE COMPOSITION FOR USE THEREIN

(75) Inventor: Andrew L. Loxley, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/064,279

(22) Filed: Jun. 28, 2002

(65) Prior Publication Data

US 2003/0011867 A1 Jan. 16, 2003

Related U.S. Application Data

(60) Provisional application No. 60/304,015, filed on Jul. 9, 2001.

(51) Int. Cl.[7] .......................... G02B 26/00; G09G 3/34; G02F 1/1333
(52) U.S. Cl. .......................... 359/296; 359/298; 345/85; 349/86
(58) Field of Search ................................ 359/296, 298, 359/245, 246, 250; 345/85; 349/86

(56) References Cited

U.S. PATENT DOCUMENTS

| | | | |
|---|---|---|---|
| 2,800,457 A | 7/1957 | Green et al. | 428/402.2 |
| 3,668,106 A | 6/1972 | Ota | 358/305 |
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,001,140 A | 1/1977 | Foris et al. | 427/213.34 |
| 4,273,672 A | 6/1981 | Vassiliades | 264/4.1 |
| 4,640,583 A | 2/1987 | Hoshikawa et al. | 349/153 |
| 4,650,288 A | 3/1987 | White | 359/296 |
| 4,690,749 A | 9/1987 | Van Alstine et al. | 204/454 |
| 4,742,345 A | 5/1988 | Di Santo et al. | 345/107 |
| 4,892,607 A | 1/1990 | DiSanto et al. | 156/275.7 |
| 5,128,226 A | 7/1992 | Hung | 430/59.6 |
| 5,213,983 A | 5/1993 | Gustafsson et al. | 438/82 |
| 5,250,938 A | 10/1993 | DiSanto et al. | 345/107 |
| 5,302,235 A | 4/1994 | DiSanto et al. | 216/5 |
| 5,380,362 A | 1/1995 | Schubert | 106/493 |

(List continued on next page.)

FOREIGN PATENT DOCUMENTS

| | | |
|---|---|---|
| EP | 0 659 866 A2 | 6/1995 |
| JP | 02-223936 A | 9/1990 |
| JP | 02-284124 A | 11/1990 |

(List continued on next page.)

OTHER PUBLICATIONS

Amundson, K., et al., "Flexible, Active–Matrix Display Constructed Using a Microencapsulated Electrophoretic Material and an Organic–Semiconductor–Based Backplane", SID 01 Digest, 160 (Jun. 2001).

Comiskey, B., et al., "An electrophoretic ink for all–printed reflective electronic displays", Nature 394, 253 (1998).

Comiskey, B., et al., "Electrophoretic Ink: A Printable Display Material", SID 97 Digest (1997), p. 75.

(List continued on next page.)

*Primary Examiner*—Georgia Epps
*Assistant Examiner*—Tim Thompson
(74) *Attorney, Agent, or Firm*—David J. Cole

(57) ABSTRACT

An electro-optic display comprises first and second substrates, and an adhesive layer and a layer of electro-optic material disposed between the first and second substrates. The adhesive layer has a volume resistivity in the range of about $10^9$ to about $10^{11}$ ohm cm and comprises a mixture of an adhesive material having a volume resistivity of at least about $5 \times 10^{11}$ ohm cm and a filler having a volume resistivity not less than about $10^7$ ohm cm, the filler being present in the mixture in a proportion above its percolation threshold in the adhesive material.

12 Claims, 3 Drawing Sheets

U.S. PATENT DOCUMENTS

| | | | |
|---|---|---|---|
| 5,403,518 A | 4/1995 | Schubert | 252/572 |
| 5,411,656 A | 5/1995 | Schubert | 345/107 |
| 5,460,688 A | 10/1995 | DiSanto et al. | 216/5 |
| 5,573,711 A | 11/1996 | Hou et al. | 252/572 |
| 5,627,561 A | 5/1997 | Laspina et al. | 345/107 |
| 5,635,317 A | 6/1997 | Taniguchi et al. | 430/7 |
| 5,686,383 A | 11/1997 | Long et al. | 503/227 |
| 5,688,584 A | 11/1997 | Casson et al. | 428/209 |
| 5,699,097 A | 12/1997 | Takayama et al. | 347/171 |
| 5,707,738 A | 1/1998 | Hou | 428/402 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,891,366 A | 4/1999 | Gruenwald et al. | 252/514 |
| 5,930,026 A | 7/1999 | Jacobson et al. | 359/256 |
| 5,961,804 A | 10/1999 | Jacobson et al. | 204/606 |
| 5,972,493 A | 10/1999 | Iwasaki et al. | 428/323 |
| 6,017,584 A | 1/2000 | Albert et al. | 427/313.3 |
| 6,067,185 A | 5/2000 | Albert et al. | 359/296 |
| 6,113,810 A | 9/2000 | Hou et al. | 252/572 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,147,791 A | 11/2000 | Sheridon | 359/296 |
| 6,177,921 B1 | 1/2001 | Comiskey et al. | 345/107 |
| 6,215,920 B1 | 4/2001 | Whitehead et al. | 385/18 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 250/216 |
| 6,377,387 B1 | 4/2002 | Duthaler et al. | 359/296 |
| 6,392,786 B1 | 5/2002 | Albert | 359/296 |
| 6,413,790 B1 | 7/2002 | Duthaler et al. | 438/21 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,498,114 B1 | 12/2002 | Amundson et al. | 438/780 |
| 6,498,674 B1 * | 12/2002 | Sheridon | 359/296 |
| 6,504,524 B1 | 1/2003 | Gates et al. | 345/107 |
| 6,506,438 B2 | 1/2003 | Duthaler et al. | 427/58 |
| 6,512,626 B1 * | 1/2003 | Schmidt | 359/296 |
| 6,515,649 B1 | 2/2003 | Albert et al. | 345/107 |
| 6,531,997 B1 | 3/2003 | Gates et al. | 345/107 |
| 6,538,801 B2 | 3/2003 | Jacobson et al. | 359/296 |
| 2001/0030639 A1 | 10/2001 | Goden | 345/107 |
| 2001/0045934 A1 | 11/2001 | Turner et al. | 345/107 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0063677 A1 | 5/2002 | Drzaic | 345/107 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131147 A1 | 9/2002 | Paolini, Jr. et al. | 359/296 |
| 2002/0154382 A1 | 10/2002 | Morrison et al. | 359/296 |
| 2002/0171910 A1 | 11/2002 | Pullen et al. | 359/296 |
| 2002/0180687 A1 | 12/2002 | Webber | 345/107 |
| 2002/0180688 A1 | 12/2002 | Drzaic et al. | 345/107 |
| 2002/0185378 A1 | 12/2002 | Honeyman et al. | 204/601 |

FOREIGN PATENT DOCUMENTS

| | | |
|---|---|---|
| JP | 02-284125 A | 11/1990 |
| JP | 05-143009 A | 6/1993 |
| JP | 05-307197 A | 11/1993 |
| JP | 06-118452 A | 4/1994 |
| JP | 2000-259102 | 9/2000 |
| JP | 2002-072258 | 3/2002 |
| WO | WO 99/67678 | 12/1999 |
| WO | WO 00/05704 | 2/2000 |
| WO | WO 00/20922 | 4/2000 |
| WO | WO 00/26761 | 5/2000 |
| WO | WO 00/36560 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/07961 | 2/2001 |
| WO | WO 01/08241 | 2/2001 |
| WO | WO 01/17029 | 3/2001 |
| WO | WO 01/27690 | 4/2001 |

OTHER PUBLICATIONS

Drzaic, P., et al., "A Printed and Rollable Bistable Electronic Display", SID 98 Digest (1998), p. 1131.

Gutcho, M.H., Microcapsules and Microencapsulation Techniques, Noyes Data Corp., Park Ridge NJ, (1976).

Hou, J., et al., "Active Matrix Electrophoretic Displays Containing Black and White Particles with Opposite Polarities", SID 01 Digest, 167 (Jun. 2001).

Jacobson, J., et al., "The last book", IBM Systems J., 36, 457 (1997).

Ji, Y., et al., "P-50: Polymer Walls in Higher–Polymer–Content Bistable Reflective Cholesteric Displays", SID 96 Digest, 611 (1996).

Kazlas, P., et al., "12.1" SVGA Microencapsulated Electrophoretic Active Matrix Display for Information Appliances, SID 01 Digest, 152 (Jun. 2001).

Vandegaer, J.E. (ed.), "Microencapsulation Processes and Applications", pp. v–x, 1–180 (Plenum Press, New York 1974).

Wood, D., Information Display, 18(3), 24 (Mar. 2002).

* cited by examiner

ELECTRO-OPTIC DISPLAY AND ADHESIVE COMPOSITION FOR USE THEREIN

CROSS REFERENCE TO RELATED APPLICATIONS

This application claims priority from Provisional Application Serial No. 60/304,015, filed Jul. 9, 2001; the entire disclosure of this Provisional Application is herein incorporated by reference.

BACKGROUND OF INVENTION

This invention relates to electro-optic displays and to adhesive compositions for use therein. More specifically, this invention relates to adhesive compositions having controlled volume resistivity, and to electro-optic displays incorporating such adhesive compositions. The adhesive compositions of the present invention may also be useful in applications other than electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

One type of electro-optic display is the rotating bichromal member type as described, for example, in U.S. Pat. Nos. 5,808,783; 5,777,782 and 5,760,761 (this type of electro-optic medium is often referred to as a "rotating bichromal ball" medium, but the term "rotating bichromal member" is preferred since in some versions of the medium the rotating members are not spherical).

Another type of electro-optic medium is an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). Nanochromic films of this type are also described, for example, in International Applications Publication Nos. WO 98/35267 and WO 01/27690, and in copending Applications Serial Nos. 60/365,368; 60/365,369; 60/365,385 and 60/365,365, all filed Mar. 18, 2002, and Application Serial Nos. 60/319,279; 60/319,280; and 60/319,281, all filed May 31, 2002; the entire contents of all these applications are herein incorporated by reference.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; 6,377,387; 6,392,785; and 6,392,786; U.S. patent application Publication Nos. 2001-0045934; 2002-0018042; 2002-0019081; and 2002-0021270; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications are herein incorporated by reference.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19. See also copending application Ser. No. 09/683,903, filed Feb. 28, 2002, the entire disclosure of which is herein incorporated by reference, and the corresponding International Application PCT/US02/06393.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Other types of electro-optic materials, for example, liquid crystal, especially polymer-dispersed liquid crystal, may also be used in the displays of the present invention.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by the process described above is roll lamination using a lamination adhesive, which may be a pressure sensitive adhesive (PSA). Roll lamination is especially desirable since the pressures used in such lamination are effective in expelling air from between the two materials being laminated, thus avoiding unwanted air bubbles in the final display; such air bubbles may introduce undesirable artifacts in the images produced on the display.

A variety of lamination adhesives are of course readily available commercially, and several of these commercial materials have been found to meet the usual physico-chemical requirements for use in the roll lamination process described above, in that they provide a bond of sufficient strength and durability and are chemically compatible with the other components of the display, in that, for example they do not release any materials which interfere with the proper switching of the electrophoretic medium.

Unfortunately, there is one requirement for the proper operation of electrophoretic and other electro-optic displays which has not been found to be met by any commercial pressure sensitive adhesive, namely appropriate volume resistivity. In an electro-optic display, it is highly desirable to correlate the volume resistivity of the adhesive layer with that of the electro-optic medium itself. If the resistivity of the adhesive layer is too high, a substantial voltage drop will occur within the adhesive layer, requiring an increase in voltage across the electrodes to maintain the same voltage drop across the electro-optic medium, and thus maintain the same switching time of the medium. Increasing the voltage across the electrodes in this manner is undesirable, since it increases the power consumption of the display, and may require the use of more complex and expensive control circuitry to generate (in the case of battery-powered portable devices) and/or handle the increased voltage involved. On the other hand, if the adhesive layer, which extends continuously across the display, is in contact with a matrix of closely-spaced electrodes, such as the pixel electrode arrays used for active matrix displays, the volume resistivity of the adhesive layer should not be too low, or lateral conduction of electric current through the continuous adhesive layer may cause undesirable cross-talk between adjacent electrodes.

Encapsulated electrophoretic media typically have volume resistivities of the order of $5 \times 10^{10}$ ohm cm, and the volume resistivities of other electro-optic media are usually of the same order of magnitude. For the foregoing reasons, the volume resistivity of lamination adhesives used with such media should be around $10^{10}$ ohm cm, whereas commercial PSA"s have volume resistivities of about $10^{12}$ to $10^{15}$ ohm cm. It is known that the volume resistivities of insulators (and lamination adhesives are insulators by normal standards) can be decreased by blending a conductive filler (for example, silver flake, carbon black, polyaniline or poly(3,4-ethylenedioxythiophene)) with the insulator. Unfortunately, there are grave difficulties in adopting this approach to achieve the volume resistivities of about $10^{10}$ ohm cm required for adhesives used in electro-optic displays. Experimentally, it has been found that as the proportion of filler in the adhesive is gradually increased from zero, the volume resistivity of the blend remains substantially equal to that of the adhesive until a threshold value (known as the percolation threshold) is reached. At this point, a small increase in the proportion of filler present produces an enormous decrease in resistivity by several orders of magnitude to a value typically about one order of magnitude greater than that of the conductive filler itself. This is illustrated in FIG. 1 of the accompanying drawings, which is taken from Donnet, J-B., et al. (eds.), Carbon Black Science and Technology (2d Edn., Marcel Dekker, New York, 1993), which illustrates the effect of adding various types of carbon black to high density polyethylene. This Figure shows that the percolation threshold may vary over a wide range from less than 5 percent to more than 50 percent. After this sudden drop in resistivity, further increases in the proportion of conductive filler cause only a very gradual further decrease in volume resistivity of the blend. If one starts from an adhesive having a volume resistivity of about $10^{12}$ to $10^{15}$ ohm cm, the desired volume resistivity of about $10^{10}$ ohm cm required for adhesives used in electro-optic displays typically falls in the middle of the very steep section of the composition/resistivity curve, where a very small change in the proportion of filler may cause an order of magnitude change in volume resistivity. It is difficult (and may be impracticable under mass production conditions) to control the proportion of filler with sufficient accuracy to maintain the volume resistivity desired in the adhesive. Furthermore, the variation of resistivity with proportion of filler at this point is so vertiginous that inevitable slight variations in the proportion of filler in particular areas of the display may cause undesirable effects in the display.

It has now been discovered that the volume resistivity of adhesives can be varied in a controlled manner to the range required for use in electro-optic displays be blending the adhesive with a filler having a controlled volume resistivity. The volume resistivity of this filler should not be lower that about two orders of magnitude less than the intended volume resistivity of the final blend. Desirably, the volume resistivity of the filler should be at least an order of magnitude less that the intended volume resistivity of the final blend.

SUMMARY OF THE INVENTION

Accordingly, in one aspect this invention provides an electro-optic display comprising first and second substrates, and an adhesive layer and a layer of electro-optic material disposed between the first and second substrates, the adhesive layer having a volume resistivity in the range of about $10^9$ to about $10^{11}$ ohm cm and comprising a mixture of an adhesive material having a volume resistivity of at least about $5 \times 10^{11}$ ohm cm and a filler having a volume resistivity not less than about $10^7$ ohm cm, the filler being present in the mixture in a proportion above its percolation threshold in the adhesive material.

This invention also provides an adhesive composition comprising a mixture of an adhesive material having a volume resistivity of at least about $5 \times 10^{11}$ ohm cm and a filler having a volume resistivity not less than about $10^7$ ohm cm, the filler being present in the mixture in a proportion above its percolation threshold in the adhesive material.

This invention also provides a method for the preparation of an adhesive composition having a volume resistivity of X (where X is an arbitrary number) starting from an adhesive material having a volume resistivity of at least about 10X, this method comprising blending the adhesive material with a filler having a volume resistivity not greater than about 0.1X but not less than about $10^{-3}$X, the filler being blended with the adhesive material in a proportion above its percolation threshold in the adhesive material.

DETAILED DESCRIPTION

As already mentioned, this invention provides an adhesive composition comprising a mixture of an adhesive material having a volume resistivity of at least about $5 \times 10^{11}$ ohm cm and a filler having a volume resistivity not less than about $10^7$ ohm cm, the filler being present in the mixture in a proportion above its percolation threshold in the adhesive material, and an electro-optic display incorporating this adhesive composition. The volume resistivity of the present adhesive composition can be varied in a highly controllable manner by varying the proportion of the filler, thus allowing this volume resistivity to be adjusted to its optimum value for use with any specific electro-optic medium and other components of a display.

The present invention is especially applicable to pressure sensitive adhesives, although it is also applicable to other types of adhesive, such as hot melt and heat-activated adhesives. The PSA's used in the present invention may be water-based, solvent-based or 100 percent solids, such as ultra-violet curable PSA's, and may be, for example, acrylate, urethane or silicone-based PSA's. Specific commercial materials which have been found to be useful in the present invention include Gelva (Registered Trade Mark) multipolymer resin emulsion 2417 (usually known as GME-2417), an acrylic multipolymer emulsion available from Solutia Inc, 10300 Olive Boulevard, P.O. Box 66760, St. Louis Mo. 63166-6760, and Reichhold 97982-01, an acrylic-based PSA with a glass transition temperature of about −45° C., available from Reichhold, Inc., P.O. Box 13582, Research Triangle Park N.C. 27709-3582.

Figure 1:
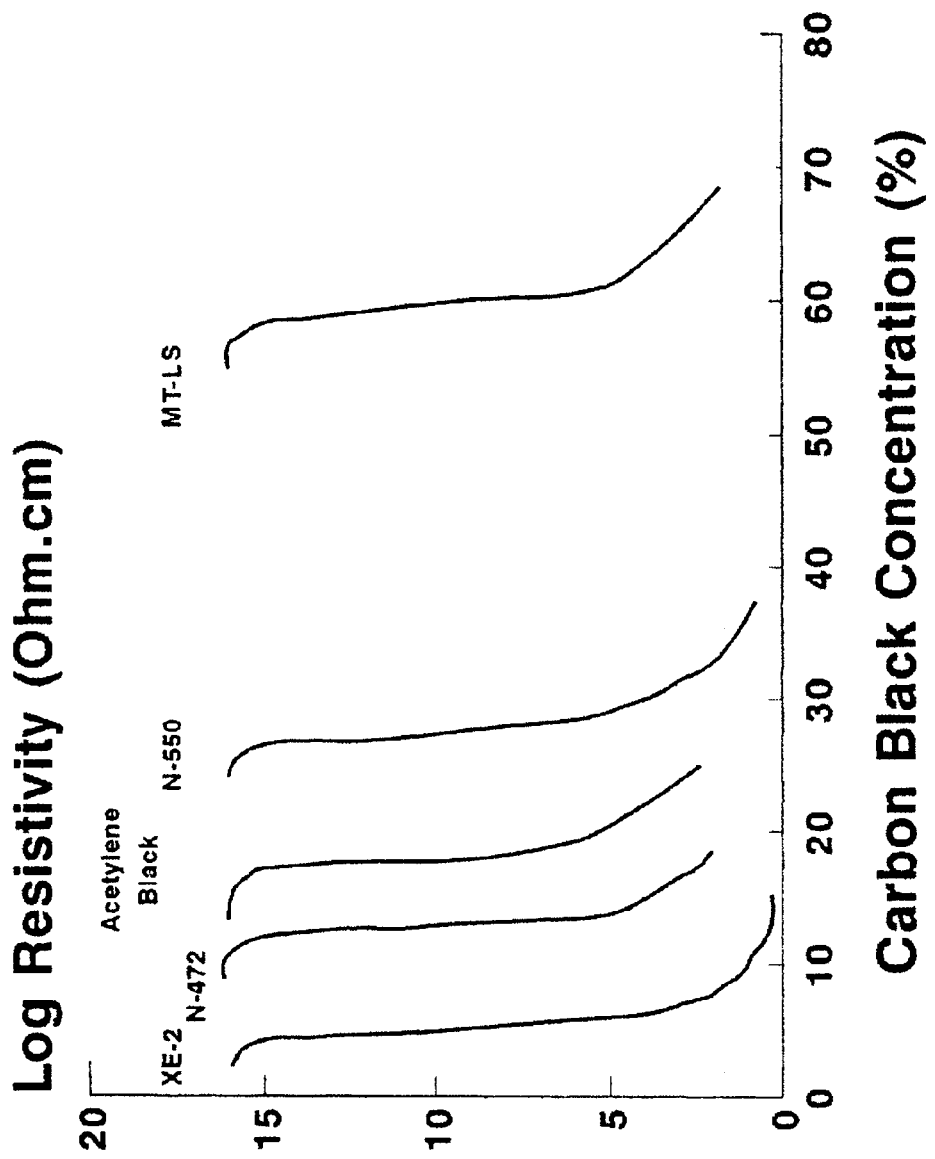
FIG. 1 of the accompanying drawings is a graph showing the change in volume resistivity of polyethylene upon addition of varying proportions of carbon black thereto.

The filler used in the present invention is typically a material having a volume resistivity in the range of about $10^8$ to $5 \times 10^9$ ohm cm, and suitable materials include polyethylene glycol, urethane polymer dispersions, tailored acrylate polymers, diamond, zirconium oxide, silicon carbide and sodium-doped glass. The presently preferred filler is Soluol 21-105HS, a polyurethane available from Soluol Chemical Co., Inc., P.O. Box 112, West Warwick R.I. 02893; Soluol 105-304 from the same manufacturer has also been found useful. The percolation threshold for the filler varies widely, from greater than 20 to less than 2 percent by volume, but can readily be determined empirically for any specific adhesive material/filler combination; as illustrated in the Examples below, the variation of volume resistivity with proportion of filler in the adhesive material/filler blend has the same general form as shown in FIG. 1, with a sharp and characteristic decrease in volume resistivity at the percolation threshold. Thus, the proportion of filler in the adhesive layer will typically be in the range of about 3 to about 50 percent by weight. The presently preferred blend for use in laminating electro-optic displays comprises about 20 percent by weight (calculated on dry weight) of Soluol 21-105HS filler and 80 percent by weight Reichhold 97982-01 pressure sensitive adhesive.

The electro-optic medium present in the displays of the present invention may be of any of the types previously discussed. Thus, the electro-optic medium may be a rotating bichromal member or electrochromic medium. However, it is preferred that the electro-optic medium be an electrophoretic medium comprising a plurality of capsules, each capsule comprising a capsule wall and an internal phase comprising electrically charged particles suspended in a suspending fluid and capable of moving through the fluid on application of an electric field to the electrophoretic medium. Desirably, in addition to the capsules, the electrophoretic medium comprises a polymeric binder within which the capsules are held.

Also, as already indicated, the display may be of any of the forms described in the aforementioned patents and applications. Thus, typically the display will comprise at least one electrode disposed between the electro-optic medium and one of the substrates, this electrode being arranged to apply an electric field to the electro-optic medium. Generally, the display will comprise two electrodes disposed on opposed sides of the electro-optic medium and between the electro-optic medium and the two substrates, at least one of the electrodes and the adjacent substrate being light-transmissive such that the electro-optic medium can be viewed through the light-transmissive substrate and electrode.

The following Examples are now given, though by way of illustration only, to show details of preferred materials, processes and techniques used in the present invention.

EXAMPLE 1

This Example illustrates the variation in volume resistivity achieved by adding the aforementioned Soluol 105-304 to the aforementioned GME-2417.

Figure 2:
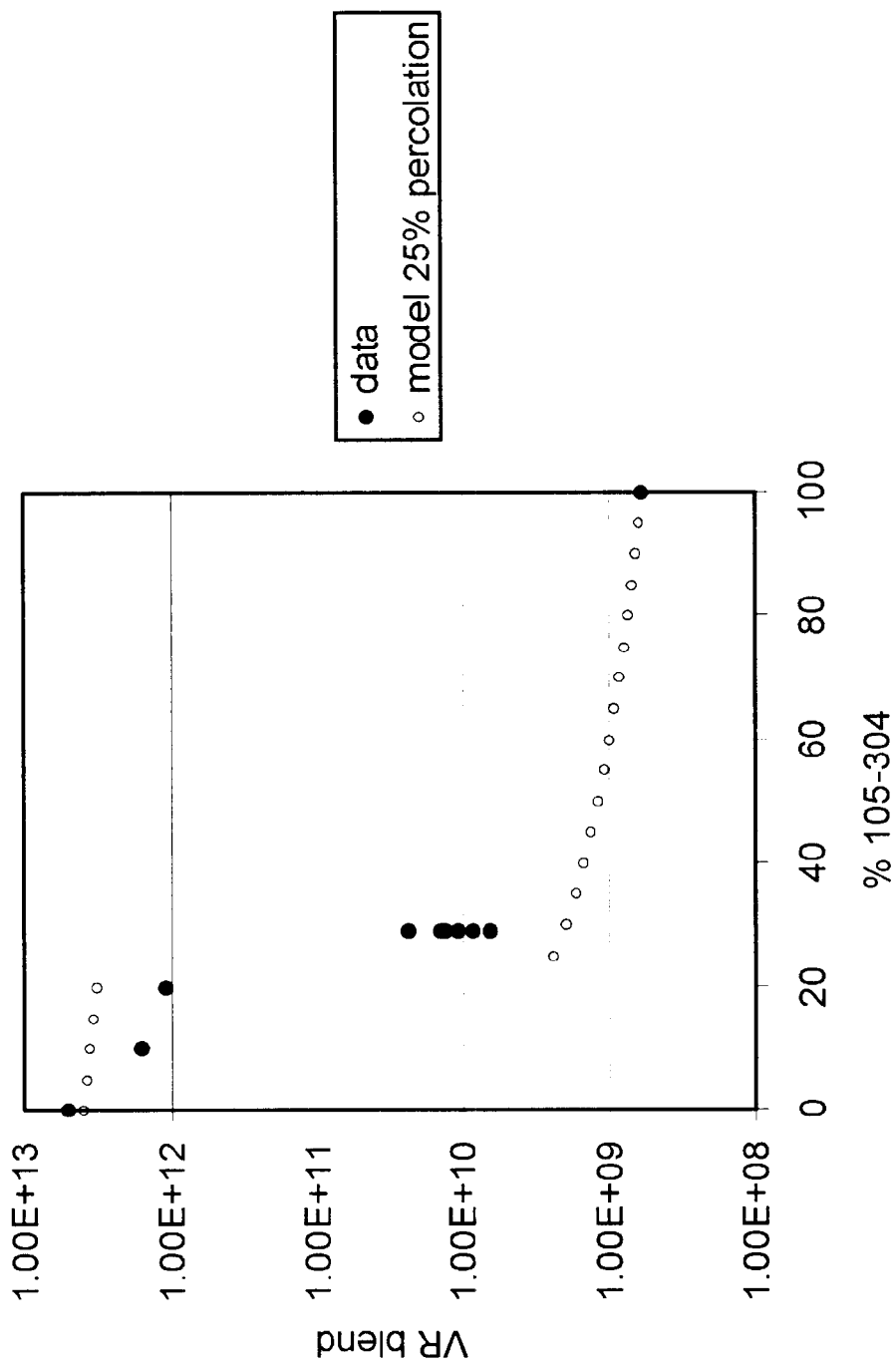
FIG. 2 is a graph showing the variation in volume resistivity of GME-2417 (see below) upon addition of varying proportions of Soluol 105-304 (see below), as described in Example 1 below.

Varying proportions of Soluol 105-304 were blended with GME-2417 and the volume resistivities of films made from the resultant blends were calculated after measuring the current flow through a film of known dimensions on the application of a known voltage. The results are illustrated in FIG. 2 of the accompanying drawings, which also shows theoretical results calculated assuming a percolation threshold for the Soluol 105-304 of 25% by volume. A simple model for percolation behavior assumes that for filler loadings below the percolation threshold the resistivity of a blend is given by the volume-fraction-weighted resistivity of the adhesive material in series with the filler. In other words, before percolation:

$$VR_{blend} = \rho_{adhesive}\phi_{adhesive} + \rho_{filler}\phi_{filler}$$

where $\rho$ is the volume resistivity and $\phi$ is the volume fraction of each material in the film. Blends with a filler loading above the percolation threshold behave electrically as two resistors in parallel, and the film resistivity can be estimated by:

$$VR_{blend} = \frac{1}{\left(\frac{\phi_{adhesive}}{\rho_{adhesive}} + \frac{\phi_{filler}}{\rho_{filler}}\right)}$$

The open circles in FIG. 2 (and those in FIG. 3 discussed below) are volume resistivities calculated using these equations.

It will be seen from FIG. 2 that this model fits the experimental data reasonably well. It will also be seen that at approximately 40 percent by volume filler loading, this blend has a volume resistivity of approximately $10^9$ ohm cm, and is thus useful for laminating an electro-optic display.

EXAMPLE 2

This Example illustrates the variation in volume resistivity achieved by adding NeoRez R 9320 (a water-dispersible polyurethane available from NeoResins, 730 Main Street, Wilmington, Mass. 01887) to the aforementioned GME-2417.

Figure 3:
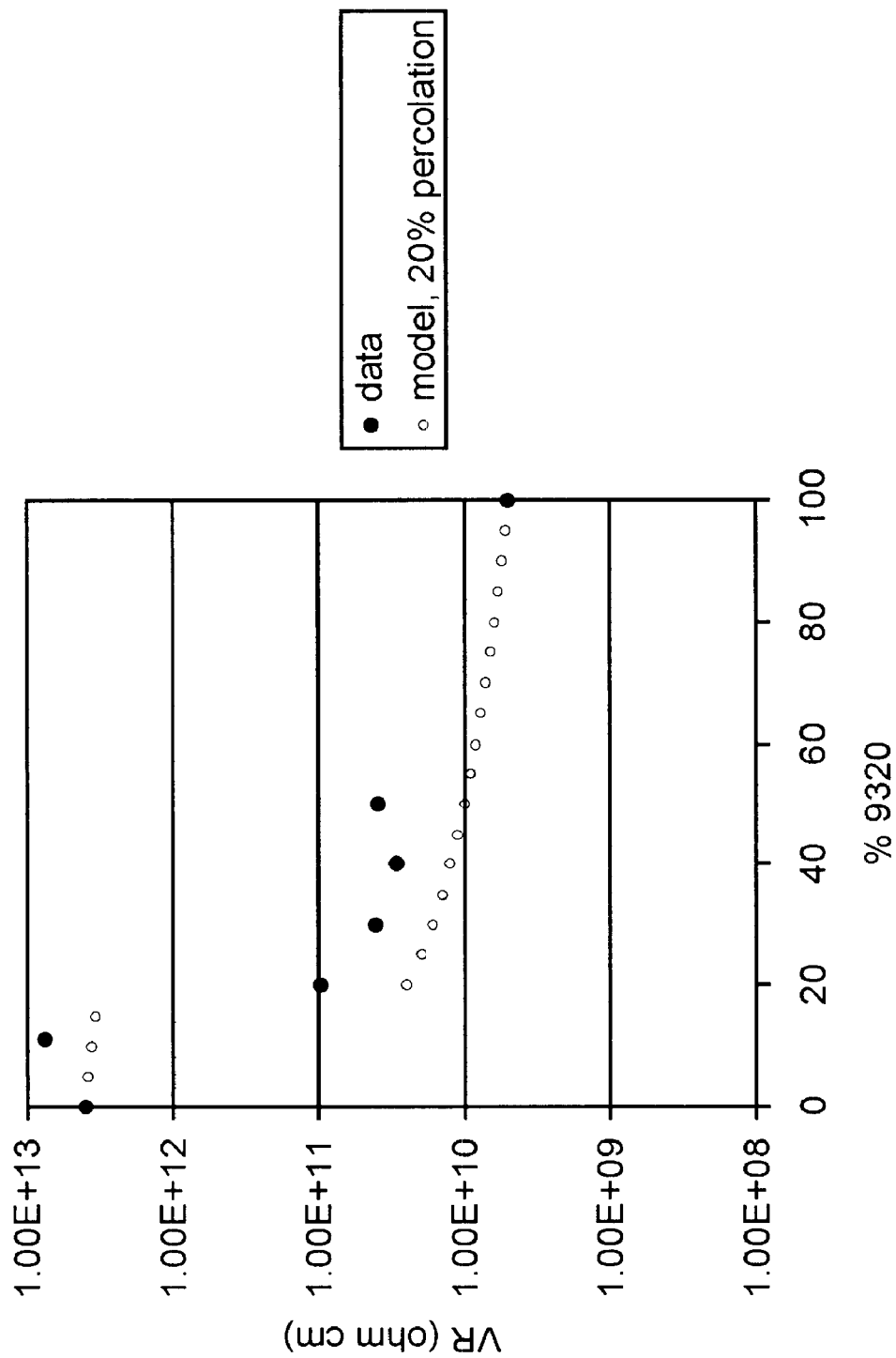
FIG. 3 is a graph showing the variation in volume resistivity of GME-2417 (see below) upon addition of varying proportions of NeoRez R 9320 (see below), as described in Example 2 below.

Varying proportions of NeoRez R 9320 were blended with GME-2417 and the volume resistivities of the resultant blends were measured in the same way as in Example 1 above. The results are illustrated in FIG. 3 of the accompanying drawings, which also shows theoretical results calculated assuming a percolation threshold of 20 percent by volume. As in Example 1 above, the experimental results are a reasonably good fit to the model, displaying a sudden drop as the percolation threshold is passed and a slow decrease thereafter as the proportion of filler is increased. It will also be seen that at about 40 percent filler loading, the blend has a volume resistivity of about $3 \times 10^{10}$ ohm cm, rendering it suitable for use in lamination of an electro-optic display.

Apart from the inclusion of the adhesive composition of the present invention, the electrophoretic media and displays of the present invention may employ the same components and manufacturing techniques as in the aforementioned patents and applications. The following Sections A–E describe useful materials for use in the various components of the encapsulated electrophoretic displays of the present invention.

A. Electrophoretic Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersability.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 $\mu$m up to about 100 $\mu$m, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when movement of the particles is desired. The refractive index of the suspending fluid may also be substantially matched to that of the particles. As used herein, the refractive index of a suspending fluid is substantially matched to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl)sodium sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co-, Ca-, Cu-, Mn-, Ni-, Zn-, and Fe-salts of naphthenic acid, Ba-, Al-, Zn-, Cu-, Pb-, and Fe-salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn- and Zn-heptanoate, and Ba-, Al-, Co-, Mn-, and Zn-octanoate. Useful block or comb copolymers include, but are not limited to, AB diblock copolymers of (A) polymers of 2-(N,N-dimethylamino) ethyl methacrylate quaternized with methyl p-toluenesulfonate and (B) poly(2-ethylhexyl methacrylate), and comb graft copolymers with oil soluble tails of poly (12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200 and 3700, and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both *Microencapsulation, Processes and Applications*, (I. E. Vandegaer, ed.), Plenum Press, New York, N.Y. (1974) and Gutcho, *Microcapsules and Microencapsulation Techniques*, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly (vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/microcapsule interfacial tension. Polysiloxanes are typically used in such an application to improve surface leveling while minimizing other defects within the coating. Surface tension modifiers include, but are not limited to, fluorinated surfactants, such as, for example, the Zonyl® series from du Pont, the Fluorad® series from 3M (St. Paul, Minn.), and the fluoroalkyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the microcapsule layer to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

E. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax® species (Union Carbide, Danbury, Conn.), and poly(2-hydroxyethyl acrylate).

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack", softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60× gravity ("g"), the capsules 180 are found at the bottom of the centrifuge tube 182, while the water portion 184 is at the top. The water portion is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself; the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

It will be apparent to those skilled in the art that numerous changes can be made in the specific embodiments of the present invention already described without departing from the spirit scope of the invention. Accordingly, the whole of the foregoing description is to be construed in an illustrative and not in a limitative sense.

From the foregoing, it will be seen that the present invention provides for ready optimization of adhesive compositions used in electro-optic displays. The present can use readily available materials to achieve the desired adjustment of the volumes resistivity of adhesives, and requires only conventional apparatus and processing techniques which are familiar to those skilled in the manufacture of electro-optic displays.

What is claimed is:

1. An electro-optic display comprising first and second substrates, and an adhesive layer and a layer of electro-optic material disposed between the first and second substrates, the adhesive layer having a volume resistivity in the range of $10^9$ to $10^{11}$ ohm cm and comprising a mixture of an adhesive material having a volume resistivity of at least $5 \times 10^{11}$ ohm cm and a filler having a volume resistivity not less than $10^7$ ohm cm, the filler being present in the mixture in a proportion above its percolation threshold in the adhesive material.

2. An electro-optic display according to claim 1 wherein the adhesive material comprises a pressure sensitive adhesive.

3. An electro-optic display according to claim 2 wherein the pressure sensitive adhesive has a volume resistivity of from $10^{12}$ to $10^{15}$ ohm cm.

4. An electro-optic display according to claim 2 wherein the pressure sensitive adhesive is an acrylate, urethane or silicone-based pressure sensitive adhesive.

5. An electro-optic display according to claim 1 wherein the filler has a volume resistivity of from $10^8$ to $5\times10^9$ ohm cm.

6. An electro-optic display according to claim 1 wherein the filler comprises any one or more of polyethylene glycol, a polyurethane polymer dispersion, an acrylate polymer, diamond, zirconium oxide, silicon carbide and sodium-doped glass.

7. An electro-optic display according to claim 1 wherein the filler comprises from 3 to 50 percent by weight of the adhesive layer.

8. An electro-optic display according to claim 1 wherein the electro-optic medium comprises a rotating bichromal member or electrochromic medium.

9. An electro-optic display according to claim 1 wherein the electro-optic medium comprises an electrophoretic medium comprising a plurality of capsules, each capsule comprising a capsule wall and an internal phase comprising electrically charged particles suspended in a suspending fluid and capable of moving through the fluid on application of an electric field to the electrophoretic medium.

10. An electro-optic display according to claim 9 further comprising a polymeric binder within which the capsules are held.

11. An electro-optic display according to claim 9 further comprising at least one electrode disposed between the electro-optic medium and one of the substrates, this electrode being arranged to apply an electric field to the electro-optic medium.

12. An electro-optic display according to claim 11 comprising two electrodes disposed on opposed sides of the electro-optic medium and between the electro-optic medium and the two substrates, at least one of the electrodes and the adjacent substrate being light-transmissive such that the electro-optic medium can be viewed through the light-transmissive substrate and electrode.

* * * * *